(12) United States Patent
Cadeddu

(10) Patent No.: US 9,126,574 B2
(45) Date of Patent: Sep. 8, 2015

(54) HYDRAULIC DEVICE FOR CONTROLLING BRAKING IN VEHICLES WITH TWO BRAKING PEDALS

(75) Inventor: Leonardo Cadeddu, Offanengo (CR) (IT)

(73) Assignee: VHIT S.P.A., Offanengo (IT)

( * ) Notice: Subject to any disclaimer, the term of this patent is extended or adjusted under 35 U.S.C. 154(b) by 175 days.

(21) Appl. No.: 13/823,532

(22) PCT Filed: Sep. 14, 2011

(86) PCT No.: PCT/IB2011/054011
§ 371 (c)(1),
(2), (4) Date: Mar. 14, 2013

(87) PCT Pub. No.: WO2012/035498
PCT Pub. Date: Mar. 22, 2012

(65) Prior Publication Data
US 2013/0175852 A1    Jul. 11, 2013

(30) Foreign Application Priority Data

Sep. 16, 2010 (IT) .............................. TO2010A0758

(51) Int. Cl.
*B60T 11/21* (2006.01)
*B60T 17/04* (2006.01)
(Continued)

(52) U.S. Cl.
CPC .............. *B60T 11/21* (2013.01); *B60T 11/108* (2013.01); *B60T 17/04* (2013.01); *B62D 11/08* (2013.01)

(58) Field of Classification Search
CPC ....... B60T 11/21; B60T 11/108; B62D 11/08; B62D 17/04

USPC .......... 303/8, 2, 9.91, 9.916; 188/345, 106 P, 188/354; 60/549, 591, 562, 581, 547.2
See application file for complete search history.

(56) References Cited

U.S. PATENT DOCUMENTS

| | | | | |
|---|---|---|---|---|
| 3,120,244 A | * | 2/1964 | Hahn | ......................... 137/512.5 |
| 3,345,112 A | * | 10/1967 | Kershner | ..................... 303/6.01 |
| 3,640,067 A | * | 2/1972 | Ingram | ........................... 60/561 |
| 3,885,391 A | * | 5/1975 | Campbell et al. | ................ 60/581 |

(Continued)

FOREIGN PATENT DOCUMENTS

| | | | |
|---|---|---|---|
| AT | 293 897 B | | 10/1971 |
| DE | 2630517 A | * | 1/1978 |

(Continued)

OTHER PUBLICATIONS

International Search Report for PCT/IB2011/054011 dated Jul. 18, 2012.

*Primary Examiner* — Thomas J Williams
*Assistant Examiner* — Mariano Sy
(74) *Attorney, Agent, or Firm* — Sughrue Mion, PLLC

(57) ABSTRACT

A device for controlling braking in vehicles with two braking pedals (PS, PD), such as farm tractors, earthmovers and the like, comprises a body (30) in which there are formed: a pair of master cylinders (12S, 12D) with an associated brake booster (13S, 13D); a duct (18) for balancing braking of the rear wheels; seats (4, 5, 6) for a pair of balancing valves (14), a trailer brake valve (15) and a valve (16) for disabling braking of the front wheels; as well as passages (36, 46, 47, 62, 72) for transmitting a control pressure from the master cylinders to the valves and from the valves to outlets from the device (1) connected to the braking systems of the wheels of the vehicle and of a trailer, if any.

24 Claims, 8 Drawing Sheets

(51) Int. Cl.
*B62D 11/08* (2006.01)
*B60T 11/10* (2006.01)

(56) References Cited

U.S. PATENT DOCUMENTS

| | | | | |
|---|---|---|---|---|
| 4,006,593 | A | * | 2/1977 | Edwards .................. 60/581 |
| 4,178,757 | A | | 12/1979 | Ketterling et al. |
| 5,190,356 | A | * | 3/1993 | Knowles ..................... 303/7 |
| 7,448,697 | B2 | * | 11/2008 | Brancolini ................ 303/9.61 |
| 8,177,306 | B2 | * | 5/2012 | Cadeddu et al. ........... 303/9.61 |
| 8,550,116 | B2 | * | 10/2013 | Batchelor ................ 137/625.25 |
| 8,789,668 | B2 | * | 7/2014 | Alberti et al. ................ 188/345 |
| 2001/0006307 | A1 | * | 7/2001 | Batchelor .................. 303/114.2 |

FOREIGN PATENT DOCUMENTS

| | | |
|---|---|---|
| DE | 32 42 982 A1 | 5/1984 |
| EP | 0 042 668 A1 | 12/1981 |
| EP | 0 047 702 A1 | 3/1982 |
| EP | 0 057 640 A2 | 8/1982 |
| EP | 0 289 302 A2 | 11/1988 |
| EP | 0 340 911 A1 | 11/1989 |
| EP | 1 114 761 A2 | 7/2001 |
| FR | 2 450 726 A1 | 10/1980 |
| GB | 2 139 720 A | 11/1984 |
| GB | 2 140 111 A | 11/1984 |
| WO | 2005/051743 A1 | 6/2005 |
| WO | 2009/090078 A2 | 7/2009 |

* cited by examiner

HYDRAULIC DEVICE FOR CONTROLLING BRAKING IN VEHICLES WITH TWO BRAKING PEDALS

CROSS REFERENCE TO RELATED APPLICATIONS

This application is a National Stage of International Application No. PCT/IB2011/054011 filed Sep. 14, 2011, claiming priority based on Italian Patent Application No. TO2010A000758 filed Sep. 16, 2010, the contents of all of which are incorporated herein by reference in their entirety.

The present invention refers to a hydraulic device for controlling braking in vehicles with two braking pedals, such as farm tractors, earthmovers and the like.

In certain vehicles, like those mentioned above, use is made of two pedals, which are each connected to a master cylinder acting as a pump and which can be actuated individually, if only the rear wheel on the corresponding side of the vehicle is to be braked, or jointly, if the rear wheels on both sides are to be braked. In the latter case, in order to ensure a balanced braking, i.e. substantially of the same intensity, on both sides, a balancing system is provided between the chambers of the two cylinders, which system puts the chambers in communication when both pedals are actuated.

Moreover, in the above vehicles, braking systems can be provided also on the front wheels and/or on a trailer, if any. Such systems are controlled by the master cylinders through a front braking disconnecting valve, which disables the front braking when only one pedal is actuated, and/or through a trailer brake valve, respectively.

In the above vehicles, the space available for the device controlling braking (the whole of the master cylinders, possibly equipped with respective brake boosters, and the valves), is generally limited and hence it is indispensable to construct control devices that are as far as possible compact.

WO 2007/131758 discloses a braking system comprising all valves mentioned above, and states that the balancing valves use components of the cylinders. The mounting of the balancing valves is not shown, and the other valves are located externally of the master cylinders and hence they must be connected to the latter through suitable ducts. This makes the system relatively cumbersome and complex, and hence expensive to be mounted. Moreover, there are a high number of components, and this in turn increases the costs and the probability of failures, taking into account the severe working conditions of the concerned vehicles.

WO 2009/077190 discloses a balancing system with a balancing valve on each master cylinder and a balancing duct connecting both valves, and mentions the possibility of controlling also a front braking disconnecting valve and a trailer brake valve by means of the master cylinders. The balancing valves are integrated into the body of the respective cylinder, yet in series therewith, so that the longitudinal overall size is high. The balancing duct is an external tube and also the front braking disconnecting valve and the trailer brake valve are located externally of the cylinders, so that the problem discussed above remains unsolved.

It is an object of the invention to provide a device for controlling braking in vehicles with two braking pedals, which is compact and uses a number of components as small as possible, thereby simplifying the mounting and reducing the related costs and the failure probability.

According to the invention, this is obtained in that the balancing duct, the seats for all the above valves, and passages for transmitting the control pressure to the valves and from the valves to outlets connected to the various braking systems are formed within a body in which the master cylinders are formed.

Preferably, the control device also comprises a brake booster associated with each master cylinder and formed in said body. The brake booster is advantageously associated with a supply pressure limiting valve in order to lower the knee point of the booster itself, and also such a valve is housed in said body.

Other advantages and features of the invention will become more apparent from the following detailed description, with reference to the accompanying drawings, in which.

Figure 1:
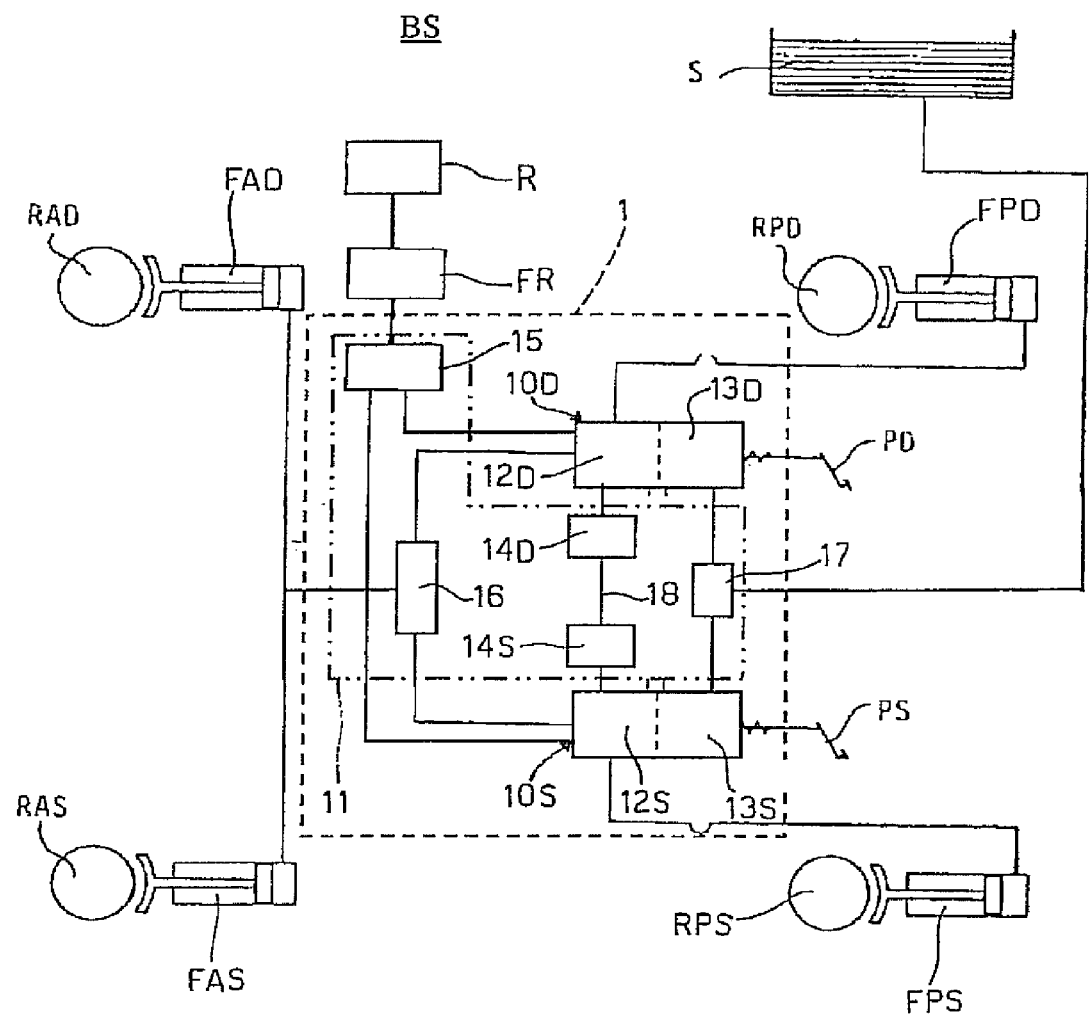
FIG. 1 is the diagram of a braking system where the invention is applied.
Figure 2:
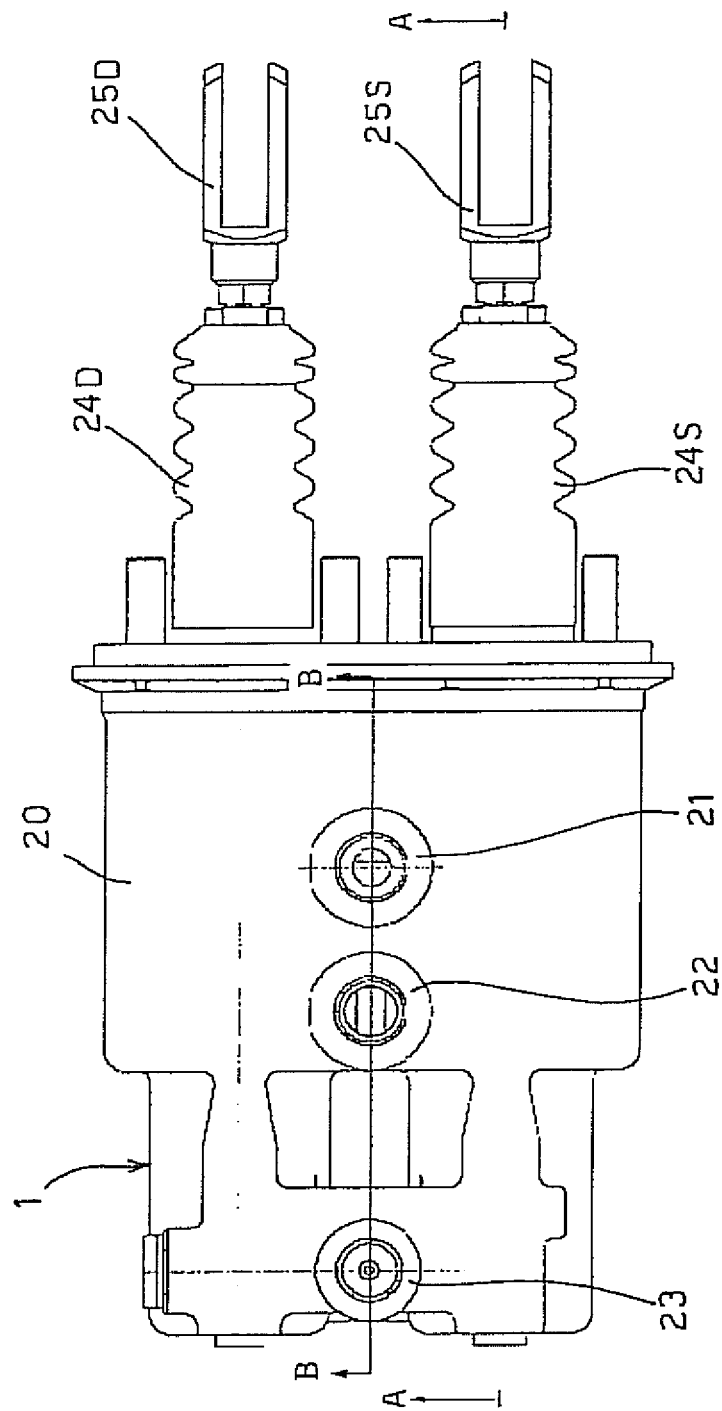
FIG. 2 is a plan view of the control device according to the invention, in the case of first valve arrangement.

Referring to FIG. 1, there is schematically shown the braking system BS of a four-wheel vehicle with two braking pedals PS (left pedal) and PD (right pedal), for instance a farm tractor, an earthmover and so on, assuming that all wheels of the vehicle as well as the wheels of a possible trailer R can be braked. Reference symbols RAS, RAD denote the left and right front wheels, RPS, RPD the left and right rear wheels, FAS, FAD, FPS, FPD the braking systems of the above wheels, and FR the braking system of trailer R. Pedals PS, PD control the braking systems through a hydraulic control device generally denoted by reference numeral 1 and comprising a pair of hydraulic units 10S, 10D and a valve set or system 11 for transmitting to the braking systems a control pressure generated in the cylinder because of the brake pedal actuation. As usual in this type of vehicles, pedals PS, PD can be individually or jointly actuated. Actuation of only one pedal PS, PD controls braking of the rear wheel located on the same side and, in the present invention, also braking of trailer R, if any. Simultaneous actuation of both pedals controls instead braking of all vehicle wheels, besides the trailer wheels.

Each control unit 10S, 10D includes a master cylinder 12S, 12D acting as a pump for braking systems FAS, FAD, FPS, FPD and FR, and possibly a brake booster 13S, 13D.

If, as assumed, all wheels of the vehicle and the wheels of trailer R can be braked, valve set 11 includes:

a pair of balancing valves 14S, 14D, each associated with one of master cylinders 12S, 12D and intended to equalise the pressures in the chambers of both master cylinders by putting such chambers in communication through a balancing duct 18 when pedals PS, PD are simultaneously actuated;

- a trailer brake valve 15, intended to control braking of trailer R when at least one pedal PS, PD is actuated
- a front braking disconnecting valve (logic head) 16, intended to control braking of front wheels RAS, RAD and rear wheels RPS, RPD when both pedals PS, PD are actuated, and to allow braking of rear wheels RPS, RPD only when only one pedal PS, PD is actuated.

In other cases, however, the valve set could even include only balancing valves 14S, 14D or only one out of valves 15 and 16 besides valves 14S, 14D.

A fluid reservoir S, in particular a hydraulic oil reservoir, provides the fluid required for the operation of master cylinders 12S, 12D and, if pressurised, also of brake boosters 13S, 13D, if any.

If the brake boosters are provided, the valve set may also include a valve 17 limiting their supply pressure, in order to lower the knee point (or saturation point) of their operating characteristics, i.e. the point where the ratio between the increase in the hydraulic pressure applied to the brakes and the increase in the force applied to the pedals changes.

Even if for sake of clarity valve set 11 has been shown outside control units 10S, 10D, according to the invention device 1 is an integrated device, and the whole valve set 11, together with balancing duct 18 and the communication passages between cylinders 12S, 12D and the valves and between the valves and the device outlets connected to the various braking systems, is built inside the body of control units 10S, 10D. In this way, the size and the number of components (and hence the complexity, the cost and the possibility of failures) of device 1 are reduced.

The structure of device 1 is shown in FIGS. 2 to 5. There, elements present in or associated with both units 10S, 10D are denoted, when both of them are shown, with suffix S or D, respectively. However, for sake of simplicity, in the description the suffix will be omitted when its presence is not necessary for the understanding, and in this case reference will be made to units 10, cylinders 12 etc.

Device 1 comprises a housing 20 enclosing a body 30, common to both control units 10, where axial bores 31 receiving master cylinders 12 and brake boosters 13 are formed. Bosses 21, 22, 23 for the connection of supply and discharge ducts for the oil operating the system and the connection of a duct conveying oil to braking system FR are formed in the top part of housing 20. Bosses 75S, 75D, 77 for the connection of ducts conveying oil to braking systems FAS, FAD, FPS, FPD are formed in the bottom part of the housing. At one end of housing 20, externally thereof, protecting caps 24S, 24D for rods 19 actuating the master cylinders are secured. The rods have, at their free ends, means 25S, 25D for fastening pedals PS, PD, for instance forks for the pivotal mounting of the pedals.

Master cylinder 12 and brake booster 13 are for instance made as disclosed in EP 1457400, to which reference is made for a detailed description of their structure and their operation. Here, only the main components of such devices will be shortly disclosed.

Axial bore 31 is divided by a stationary disc 32 into a front part 31A with reduced diameter where piston 33 of master cylinder 12 is longitudinally slidable, and a rear part 31B of larger diameter where piston 38 of brake booster 13 is longitudinally slidable.

Piston 33 defines, in such a front part 31A, a chamber 35 arranged to contain oil at a control pressure depending on the force applied to the piston by means of the corresponding pedal. Chamber 35 communicates, through radial outlet passages 36, 46, with valves 14, 15, 16, as it will be better disclosed below. Piston 33 is associated with a drive piston 34, which extends through rear part 31B of bore 31 and is connected to actuating rod 19. Rod 37 of piston 38 of the brake-booster is slidably mounted on drive piston 34 and defines a front chamber 39 and a rear chamber 40. Rear chamber 40 communicates with pressurised oil reservoir S (FIG. 1). Front chamber 39 communicates, in rest conditions, with chamber 40. In case of braking, chamber 39 is initially put in communication with chamber 35, into which it discharges oil through a valve system 42, thereby reducing its pressure with a proportional law. Upon attainment of the pre-filling pressure, chamber 39 is put in communication with a discharge chamber 41, thereby modulating the discharge between gasket-valve 43 and hollow space 45 between rod 37 and drive piston 34.

Figures 3, 3A:
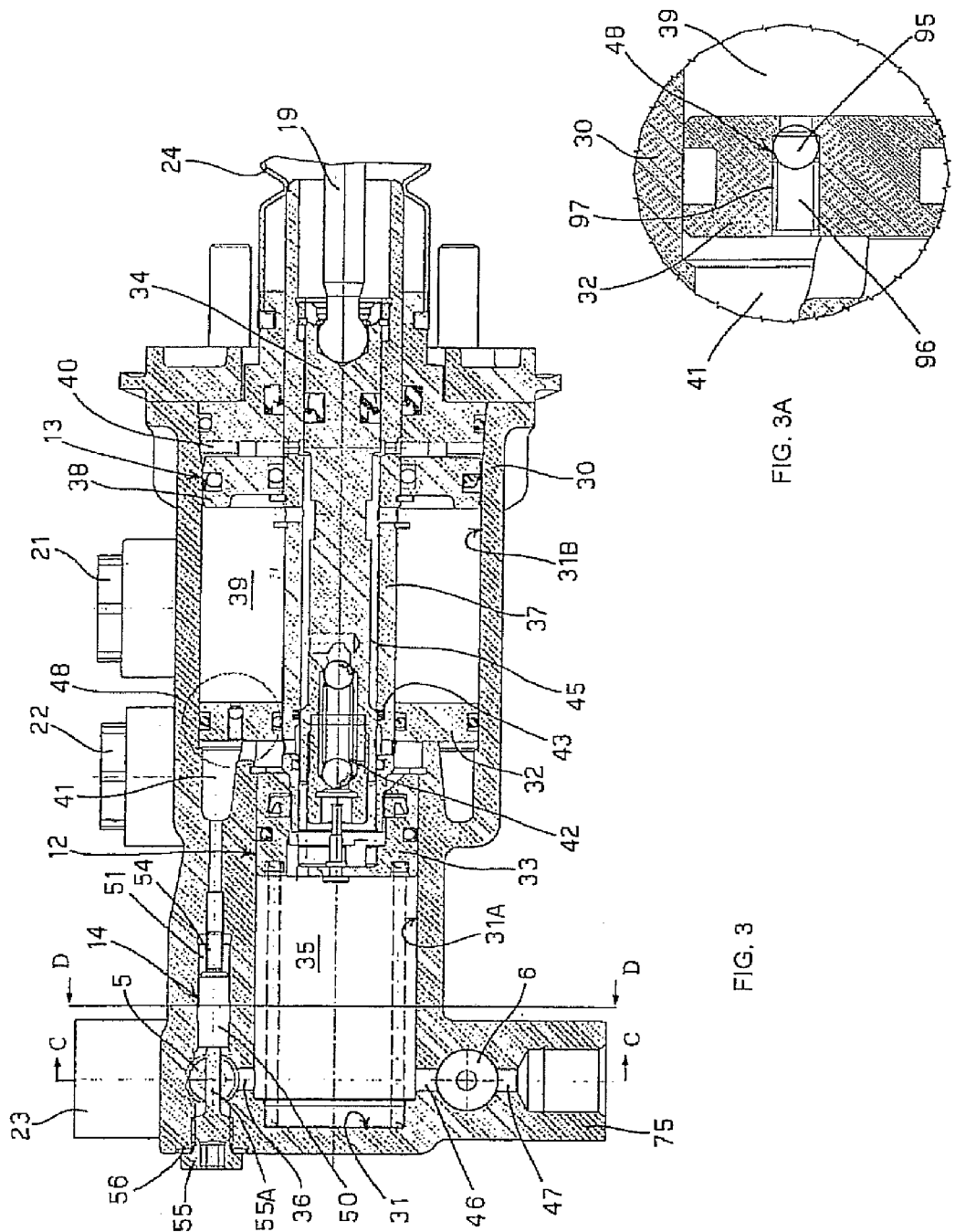
FIG. 3 is a longitudinal vertical section taken along line A-A of FIG. 2.
FIG. 3A is an enlarged view of a detail of FIG. 3.

Disc 32 may further be equipped with a safety valve 48 that, as better shown in FIG. 3A, includes a ball shutter 95 located in a passage 96 between chambers 39 and 41, on the side of chamber 41. The shutter is biased by a spring 97 suitably preloaded so as to keep such a passage closed as long as the pressure in chamber 39 does not exceed a threshold determined by the spring preload, and to open the passage when the threshold is exceeded. The provision of valve 48 is necessary when valve 17 limiting the brake booster supply pressure is provided, as it will be explained later on.

In this embodiment, balancing valves 14 and trailer brake valve 15 are mounted in body 30, in respective seats 4S, 4D, 5, which are formed above front part 31A of bores 31 and which cross each other, whereas front braking disconnecting valve 16 is mounted in a seat 6 formed below such part 31A. In particular, seats 4S, 4D of valves 14 are parallel to the longitudinal axes of cylinders 12, whereas seats 5, 6 of valves 15, 16 are transverse to said axes. The parallel arrangement of balancing valves with respect to the cylinders allows reducing the longitudinal size of units 10 with respect to the solution known from WO 2009/077190.

The outlets of seats 4, 5, 6 from body 30 are closed by respective screw plugs 55, 60, 70, and the closures are made fluid-tight by metal gaskets 56, 61, 71, for instance of copper, arranged between the head of each plug and body 30.

Figure 5:
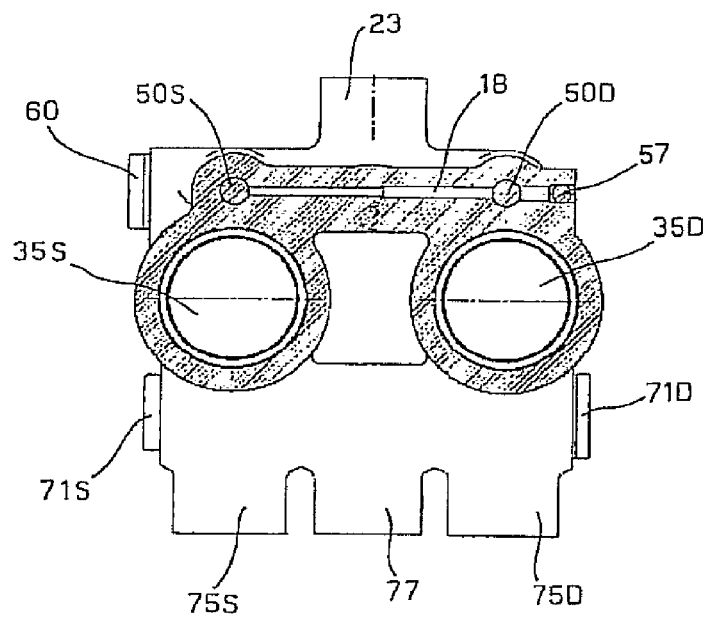
FIG. 5 is a vertical section taken along line D-D of FIG. 3.
Figure 6:
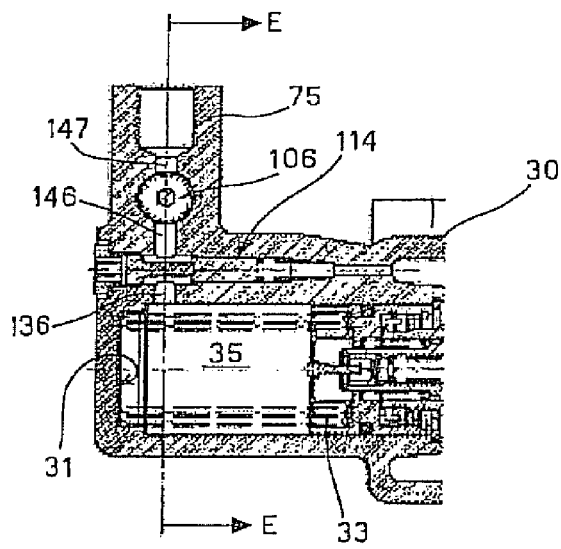
FIG. 6 is a partial longitudinal section, similar to FIG. 3, relative to a second valve arrangement.
Figure 8:
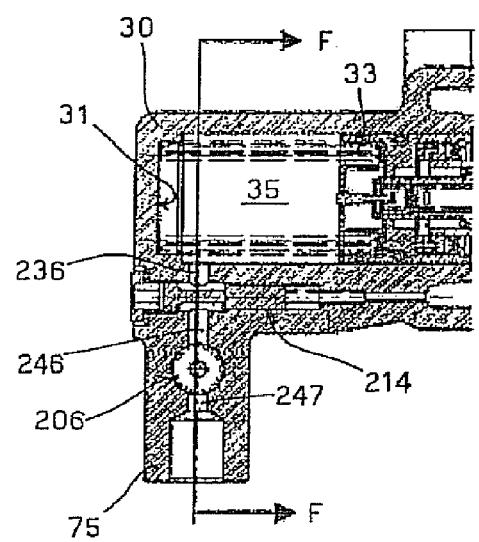
FIG. 8 is a view similar to FIG. 6, relative to a third valve arrangement.
Figure 7:
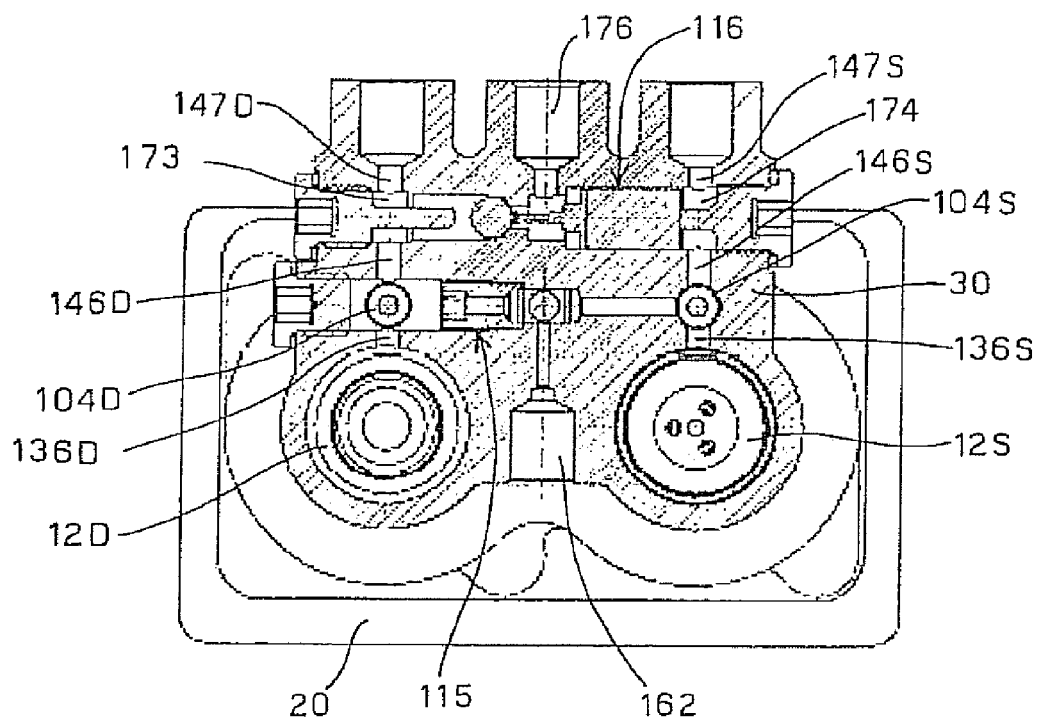
FIG. 7 is a vertical section taken along line E-E of FIG. 6.
Figure 9:
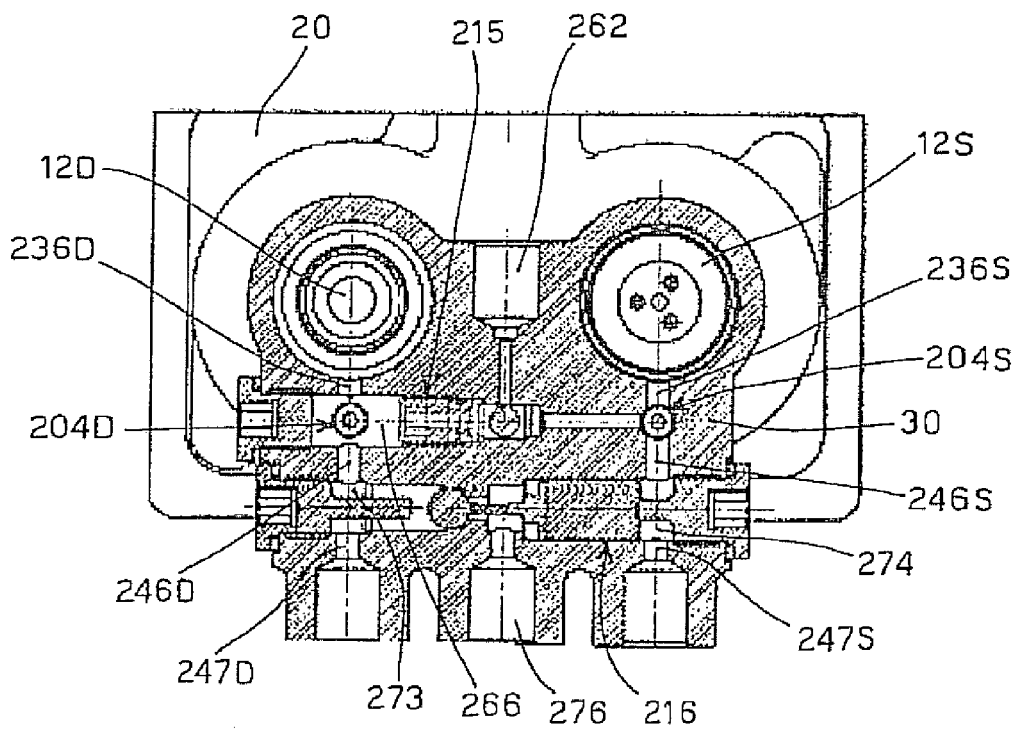
FIG. 9 is a view similar to FIG. 7, taken along line F-F of FIG. 8.

Balancing valve 14 is made as a normally closed interception valve and has a shutter 50 slidable in an axial chamber 51 in opposite direction to master cylinder piston 33. Balancing duct 18, also formed within body 30, as shown in FIG. 5, and consisting of a blind bore closed towards the outside for instance by a ball 57, ends into chamber 51. Duct 18 is formed in such a position that its outlet into chamber 51 is normally closed by shutter 50. Shutter 50 can be operated for opening in a manner fluidically controlled by the pressure taken by oil contained in chamber 35, said pressure being applied through passage 36. The sliding of shutter 50 takes place against the action of a resilient return member 54, for instance a spring, the preload of which determines a pressure threshold for the opening. Shutter 50 is thus mechanically unconstrained to piston 33. This allows a reduction in the number of components. An axial appendage 55A of plug 55 extends through seat 5 of valve 15 and serves as a stop member for shutter 50 in the rest position thereof. On the side opposite to plug 55, the stop for shutter 50 is obtained thanks to a narrowing of chamber 51. A further narrowing forms an abutment for the end of spring 54 remote from shutter 50. The narrowest portion of chamber 51 ends into discharge chamber 41 of the brake booster. The twofold communication capability for chamber 51 (with chamber 35 of the master cylinder and discharge chamber 41 of the brake booster) prevents oil possibly accumulated from remaining in a blind space in chamber 51 and thereby hindering the proper displacement of shutter 50.

Figure 4:
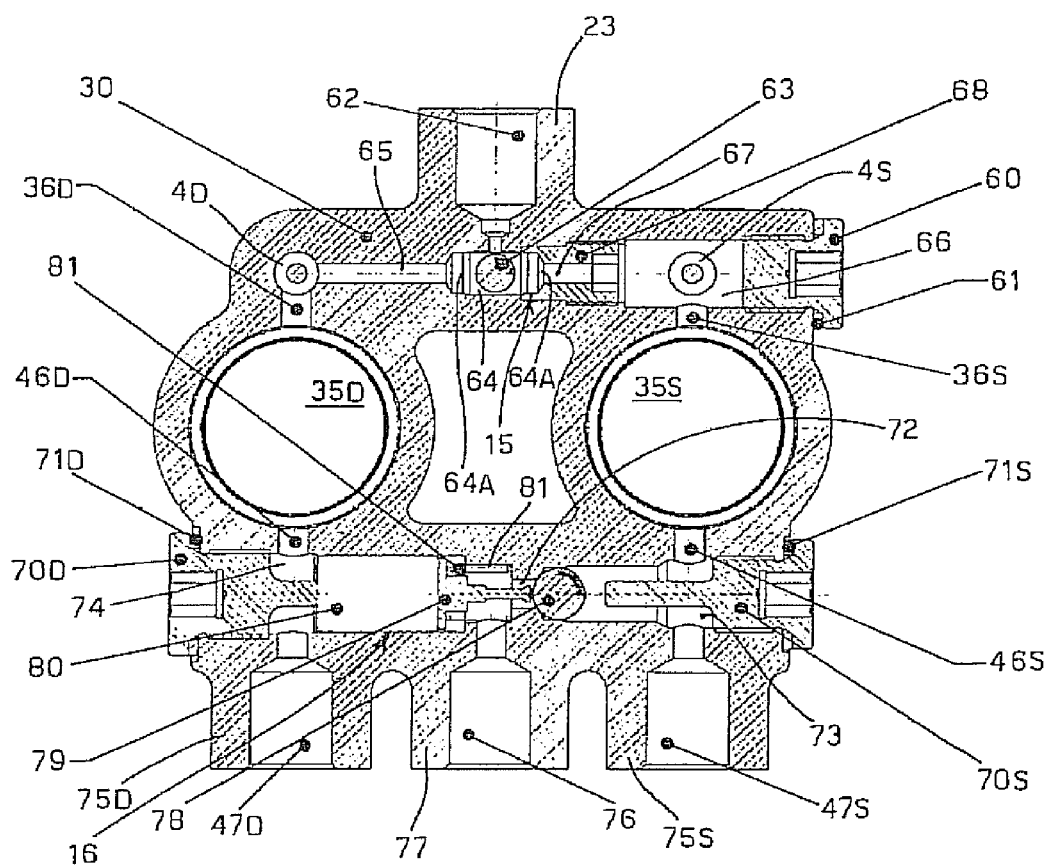
FIG. 4 is an enlarged vertical section taken along line C-C of FIG. 3.

Referring in particular to FIG. 4, valve 15 has two inlets, formed by passages 36S, 36D, and one outlet 62 towards braking system FR (FIG. 1). Communication between one of the inlets and outlet 62 is selectively established by a shutter 63, e.g. a ball shutter, moving with a radial clearance within a chamber 64 of greater diameter. The different diameters of chamber 64 and shutter 63 allow putting one inlet in communication with the output when both pedals PS, PD are actuated. One of the inlets (in the Figure, inlet 36D) communicates with chamber 64 through a first axial duct 65. The other inlet 36S ends on the contrary into a chamber 66, with greater diameter than duct 65, communicating with chamber 64 through a second axial duct 67 formed in a closing member 68 secured, e.g. screwed, in seat 5 (FIG. 3).

Valve 15 acts as an OR logic gate. Indeed, as long as none of pedals PS, PD is actuated, shutter 63 is in a random position and ducts 65, 67, 72 are connected thanks to the radial clearance between chamber 64 and shutter 63. Atmospheric pressure is present in chamber 35 and braking system FR remains inactive. When one pedal is actuated, a pressure and a fluid flow are generated in chamber 35 of the corresponding master cylinder, and they make shutter 63 move towards the opposite side, against conical seat 64A provided at the end of chamber 64, thereby letting pressurised oil pass towards braking system FR and preventing oil from being discharged towards the non-actuated cylinder. When both pedals are actuated, shutter 63 moves towards the side opposite to that from which the first pressure pulse arrives, thereby letting oil pass. If the pressure pulses arrive simultaneously from both cylinders, the fluid continues passing through the radial clearance, fed by both cylinders, between shutter 63 and chamber 64 and connects outlet 62 to one or both inlets. This operation is summarised by the following table I, where "0" and "1" denote atmospheric pressure/high pressure at the corresponding inlet/outlet, respectively.

TABLE I

| INLETS | | OUTLET |
|---|---|---|
| 36S | 36D | 62 |
| 0 | 0 | 0 |
| 1 | 0 | 1 |
| 0 | 1 | 1 |
| 1 | 1 | 1 |

Front braking disconnecting valve 16 has a pair of chambers 73, 74 with different diameters, connected to chambers 35 through passages 46S, 46D forming the inlets of valve 16. More particularly, chamber 73 houses an intercepting member 78, in particular a ball shutter, and communicates with the same cylinder as chamber 66 of valve 15. Chamber 74 houses members controlling the displacement of shutter 78, has a greater diameter than the working diameter of shutter 78 and communicates with the same cylinder as passage 65 of valve 15. Passages 46S, 46D permanently communicate, through chambers 73, 74, with first and second outlets 47S, 47D connected to braking systems FPS, FPD (FIG. 1), respectively. Given the direct connection between the inlets and the outlets, in practice rear wheel braking is directly controlled by cylinders 12, as schematised in FIG. 1. Valve 16 further has a third outlet 76 communicating with chamber 73 through a passage 72 and connected to braking systems FAS, FAD (FIG. 1). Passage 72 can be closed by shutter 78 when pressure is present only in chamber 73. Shutter 78 can be displaced, in order to open passage 72, by a stem 79 extending through passage 72 and associated with a piston 80, which is made to slide in fluid-tight manner in chamber 74 against the action of a resilient return member 81, for instance a spring, by the pressurised oil present at inlet 46D. This situation is created because of the simultaneous action of the pressures in both cylinders 35S, 35D. Under such conditions, the oil fed to front brakes FAS, FAD is the oil coming from cylinder 35S, and the oil volumes will be balanced by the balancing system.

A valve similar to valve 16 is disclosed in WO 2007/131758. Yet, contrary to the prior art valve, ball shutter 78 has no spring biasing it to the closed position and it is kept closed only by the pressure existing in chamber 35S. This is an important feature of the invention and is of advantage in the assembling line when, for introducing oil into the system, it is necessary to create vacuum in the braking circuit to discharge air. In particular, with the structure of valve 16 according to the invention, it is possible to reach the whole hydraulic circuit from a single point (the discharge port, boss 22 in FIG. 2), since shutter 78 can freely open. On the contrary, in the prior art valve, the circuit is divided into two sections isolated from each other by the shutter closed by the spring, and hence it is necessary to apply vacuum in two points (upstream and downstream the shutter), which demands a bleeding valve. Thus, besides allowing elimination of a spring, the invention also allows eliminating the bleeding valve, with a further simplification of the structure.

In respect of outlet 76, valve 16 acts as an AND logic gate and its operation is the same as that described in WO 2007/131758.

This operation of valve 16 is summarised by the following table II, where "0" and "1" again denote atmospheric pressure/high pressure at the corresponding inlet/outlet, respectively.

TABLE II

| INLETS | | OUTLETS | | |
|---|---|---|---|---|
| 46S | 46D | 47S | 47D | 76 |
| 0 | 0 | 0 | 0 | 0 |
| 1 | 0 | 1 | 0 | 0 |
| 0 | 1 | 0 | 1 | 0 |
| 1 | 1 | 1 | 1 | 1 |

Of course, both valves 15, 16 intervene when pedals PS, PD (FIG. 1) are actuated. The following table III summarises the joint operation as a function of the pedal actuation. In the columns "INLETS", "1" and "0" mean that the respective pedal is or is not actuated, whereas in columns "OUTLETS", "1" and "0" denote high pressure and atmospheric pressure, respectively.

TABLE III

| INLETS | | OUTLETS | | | | | | | |
|---|---|---|---|---|---|---|---|---|---|
| PS | PD | 36S | 46S | 36D | 46D | 47S | 47D | 76 | 62 |
| 0 | 0 | 0 | 0 | 0 | 0 | 0 | 0 | 0 | 0 |
| 1 | 0 | 1 | 1 | 0 | 0 | 1 | 0 | 0 | 1 |
| 0 | 1 | 0 | 0 | 1 | 1 | 0 | 1 | 0 | 1 |
| 1 | 1 | 1 | 1 | 1 | 1 | 1 | 1 | 1 | 1 |

As stated above, depending on the characteristics of the vehicle, valves 15 and 16 could even be dispensed with, or only one of them could be provided. Yet, seats 5, 6 for both valves (together with the seats for balancing valves 14) will be provided in body 30, and the valves will be actually mounted only if the specific application requires so. Thus, the need to manufacture different bodies 30 for devices intended for different uses is avoided, which allows a considerable reduction in the manufacturing costs.

Referring now to FIGS. 6 to 9, there are shown two variant embodiments in which all valves are arranged above (FIGS. 6, 7) or below (FIGS. 8, 9) master cylinders 12, respectively. The valves and their parts are denoted by the same reference numerals as in FIGS. 3 and 4, increased by 100 in FIGS. 6 and 7 and by 200 in FIGS. 8 and 9. The valves have the same structure as described above and their arrangement is always parallel to master cylinders 12 for valves 114, 214, and transverse for valves 115, 215 and 116, 216. Valves 114, 115 (214, 215) still are at the same level and valve 116 (216) is arranged above (below) the other ones. In FIGS. 6 to 9, the arrangement of valves 115, 116 (215, 216) is the mirror image, with respect to a vertical axis of symmetry, of that disclosed in FIGS. 3, 4.

In those variant embodiments, chambers 35 (FIGS. 3 to 5) of cylinders 12 have each a single outlet passage conveying oil to all valves and to the outlets to be operated. The valve seats divide such a passage into three sections 136, 146, 147 (236, 246, 247) permanently communicating with each other. The first section 136 (236) forms the inlets for valves 114, 115 (214, 215), whereas the second and third sections 146, 147 (246, 247) form the inlets and the first two outlets of valve 116 (216). Outlet 162 (262) of valve 115 (215) and the third outlet 176 (276) of valve 116 (216) are not substantially affected by the change in the arrangement. The operation of the valves, and hence that of the whole braking system, is identical to that described above.

Figure 10:
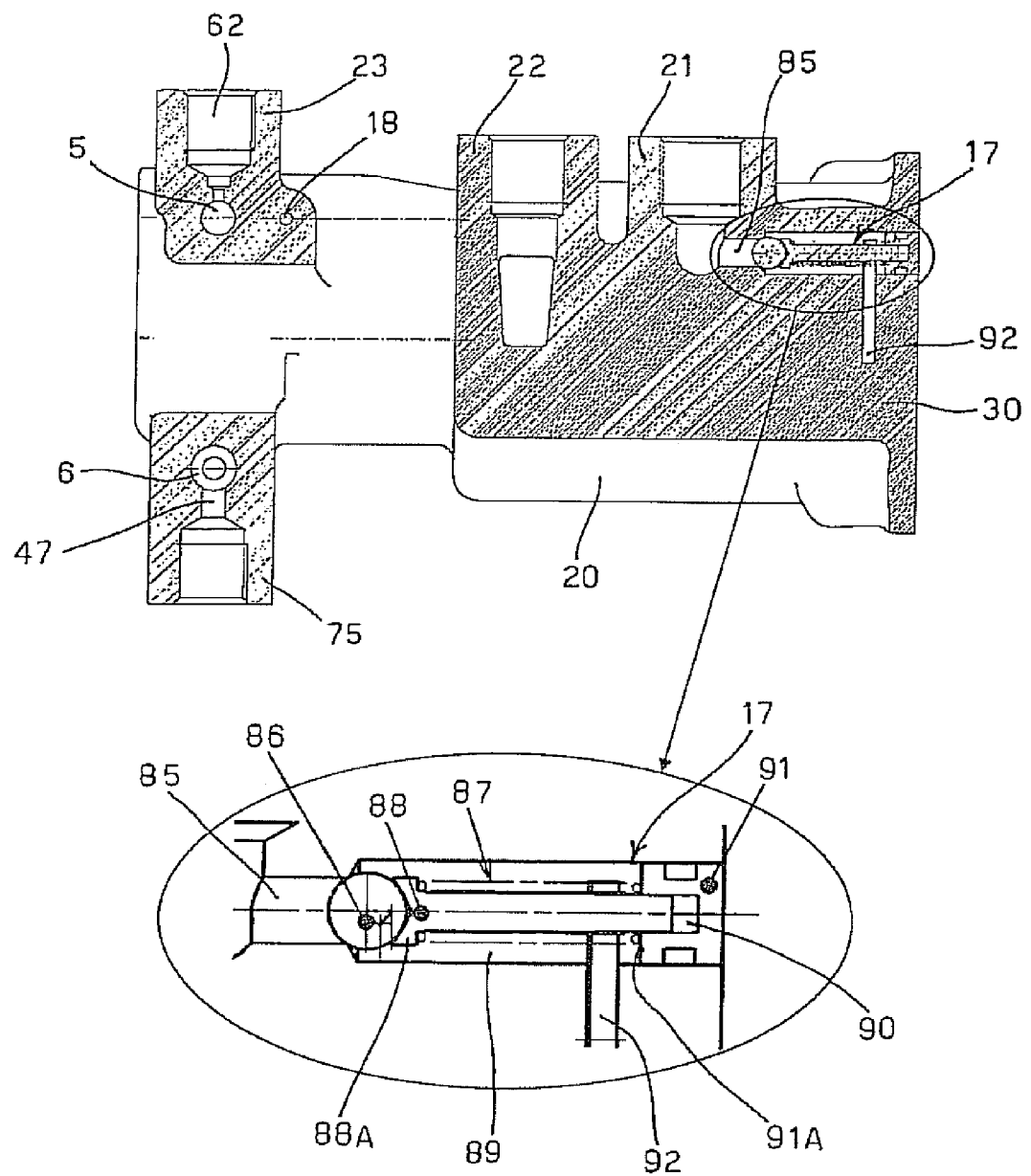
FIG. 10 is a vertical section, taken along line B-B of FIG. 2, showing a valve limiting the brake booster supply pressure.

Referring to FIG. 10, a possible embodiment of valve 17 limiting the brake booster supply pressure is shown.

Valve 17 is a normally closed interception valve, arranged in a seat 89, also formed in body 30 of device 1, between brake booster supply port 85 and ducts 92 connecting port 85 to chambers 40 (FIG. 3). Valve 17 comprises a ball shutter 86 which is kept in closed position by a spring 87 subjected to a preload depending on the specific application. Spring 87 is wound onto a guide 88 and is pre-compressed between a widened front end 88A of guide 88 and internal face 91A of a plug 91 closing seat 89. The rear end of guide 88 is received in a hollow 90 of internal face 91A of plug 91, which hollow has such a depth that it allows the axial sliding of guide 88 for opening the shutter when the pressure of the oil at the inlet exceeds the preload of spring 87.

Figure 11:
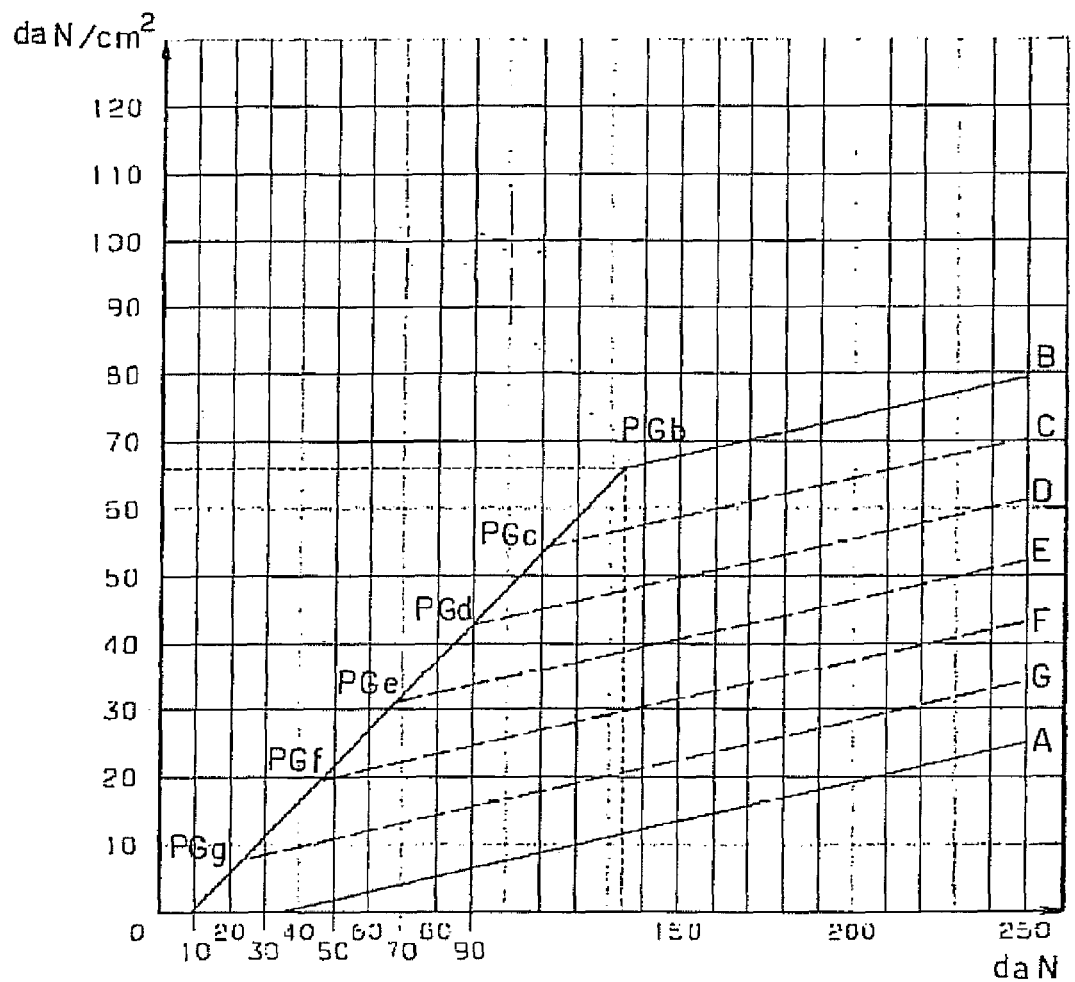
FIG. 11 is a graph showing the effects of the pressure limiting valve.

The diagram of FIG. 11 shows the behaviour of the pressure at the outlet from master cylinders 12 versus the force applied to actuation rod 19 (and hence to the pedal), when no brake booster is provided (curve A), when a brake booster without pressure limiting valve 17 is provided (curve B) and when a brake booster with pressure limiting valve 17 is provided, for different values of the preload of spring 87 (curves C-G). The lowering of knee points PGc-PGg resulting from the use of valve 17 with respect to knee point PGb of the brake booster without valve is clearly apparent.

It is however to be pointed out that the provision of valve 17 could give rise to problems should the pressure within the brake booster chambers excessively increase, e.g. due to overheating, during the periods in which the brake booster is inactive, since valve 17 acts as a non-return valve preventing the possible overpressure from being discharged towards reservoir S (FIG. 1). This could create dangers. To obviate this drawback, safety valve 48 (FIGS. 3, 3A) described above is provided, which, as stated, opens when a pressure threshold is exceeded in chamber 39, allowing oil to be discharged towards the reservoir.

It is clear that the above description has been given only by way of non-limiting example and that changes and modifications are possible without departing from the scope of the invention. Thus, for instance, even if reference has been made to simple single-stage master cylinders, the invention could also be applied to two-stage cylinders, i.e. cylinders in which the piston comprises two telescopically connected portions with different diameters, or tandem cylinders, i.e. cylinders with primary and secondary pistons defining fluidically separated primary and secondary chambers. Furthermore, it is clear that the invention can be applied also to tracked vehicles, in which the braking systems are associated with the track drive wheels.

The invention claimed is:

1. A device for controlling braking in vehicles with two braking pedals, the device comprising:
    a pair of master cylinders, each having defined therein a chamber arranged to contain a fluid having a pressure depending on an actuating force applied to a cylinder piston by a respective pedal;
    a pair of brake boosters, associated each with a master cylinder;
    a disconnecting valve, arranged to control braking systems of the vehicle when both pedals are actuated and to prevent pressurised fluid from being transmitted to a braking system of front wheels of the vehicle when only one pedal is actuated;
    a body wherein said master cylinders and said brake boosters are formed, in said body are also formed:
        a balancing duct,
        a seat for the disconnecting valve,
        passages for transmitting pressurised fluid to the disconnecting valve and from the said disconnecting valve to outlets from the device connectable to the braking systems; and
        a seat for a supply pressure limiting valve, in correspondence with a port for supplying the brake boosters with said fluid, which valve is normally closed and is arranged to open when the pressure attains a predetermined value, lower than the supply pressure of the brake booster; and
    wherein the chambers of the master cylinders are further connected to a pair of balancing valves mounted in respective seats and arranged to put said chambers in communication with the balancing duct in order to equalise the pressures in both chambers when both pedals are actuated, the balancing valves having a normally closed shutter that is mechanically unconstrained to the piston of the respective master cylinder and that can be operated, for opening, in a manner fluidically controlled by said fluid under pressure.

2. The device as claimed claim 1, characterised in that the disconnecting valve is connected to the chambers of the master cylinders and is arranged to transmit to the braking systems of the vehicle a control pressure that is the pressure depending on the actuating force applied to the piston of the cylinder or of the cylinders.

3. The device as claimed in claim 1, characterised in that the seats for the balancing valves are formed parallel to longitudinal axes of the master cylinders and in said body.

4. The device as claimed in claims 2, characterised in that the seats for the balancing valves are formed parallel to longitudinal axes of the master cylinders and in said body.

5. The device as claimed in claim 1, characterised in that the seats for the disconnecting valve are formed transversally to said longitudinal axes and in said body.

6. The device as claimed in claim 1, characterised in that each balancing valve includes a shutter slidable in a chamber communicating with a discharge chamber arranged to prevent oil possibly accumulated from remaining in a blind space in the chamber.

7. The device as claimed in claim 3, characterised in that each balancing valve includes a shutter slidable in a chamber communicating with a discharge chamber arranged to prevent oil possibly accumulated from remaining in a blind space in the chamber.

8. The device as claimed claim 4, characterised in that each balancing valve includes a shutter slidable in a chamber communicating with a discharge chamber arranged to prevent oil possibly accumulated from remaining in a blind space in the chamber.

9. The device as claimed in claim 1, characterised in that the chambers of the master cylinders are further connected to a seat for a trailer brake valve, the chambers being arranged to transmit the fluid under pressure to said trailer brake valve and from said trailer brake valve to the outlet from the device connectable to a braking system of a trailer and in that the seat for the trailer brake valve and passages for transmitting the pressure to said trailer braking valve are also formed in the body.

10. The device as claimed in claim 9, characterised in that the seat for the trailer brake valve crosses the seats for the balancing valves, and in that the passages bringing the pressure to the trailer brake valve bring such pressure also to the balancing valves.

11. The device as claimed in claim 9, characterised in that the seats for the balancing valves and the seat for the trailer brake valve are located on a same side of the master cylinders, and the seat for the disconnecting valve is located on the opposite side of the master cylinders.

12. The device as claimed in claim 10, characterised in that the seats for the balancing valves and the seat for the trailer brake valve are located on a same side of the master cylinders, and the seat for the disconnecting valve is located on the opposite side of the master cylinders.

13. The device as claimed in claims 9, characterised in that the seats for the disconnecting valve, the balancing valves and the trailer brake valve are located on a same side of the master cylinders.

14. The device as claimed in claims 10, characterised in that the seats for the disconnecting valve, the balancing valves and the trailer brake valve are located on a same side of the master cylinders.

15. The device as claimed in claim 9, characterised in that the trailer brake valve is arranged to transmit the pressure when at least one pedal is operated.

16. The device as claimed in claim 1, characterised in that the disconnecting valve has a shutter that is biased to a closed position only by the pressure existing in the chamber of one of the master cylinders, without use of biasing mechanical members.

17. The device as claimed in claim 1, characterised in that each brake booster is equipped with a safety valve arranged to allow discharging pressurised fluid towards a discharge chamber in case of an overpressure in the brake booster.

18. A device for controlling braking in vehicles with two braking pedals, the device comprising:
a pair of master cylinders, each having defined therein a chamber arranged to contain a fluid having a pressure depending on an actuating force applied to a cylinder piston by a respective pedal;
a pair of brake boosters, associated each with a master cylinder;
a disconnecting valve, arranged to control braking systems of the vehicle when both pedals are actuated and to prevent pressurised fluid from being transmitted to a braking system of front wheels of the vehicle when only one pedal is actuated;
a body where said master cylinders and said brake boosters are formed, in said body are also formed a balancing duct, a seat for the disconnecting valve, and passages for transmitting pressurised fluid to the disconnecting valve and from the said disconnecting valve to outlets from the device connectable to the braking systems;
wherein the chambers of the master cylinders are further connected to a pair of balancing valves mounted in respective seats and arranged to put said chambers in communication with the balancing duct in order to equalise the pressures in both chambers when both pedals are actuated, the balancing valves having a normally closed shutter that is mechanically unconstrained to the piston of the respective master cylinder and that can be operated, for opening, in a manner fluidically controlled by said fluid under pressure; and
wherein each brake booster is equipped with a safety valve arranged to allow discharging pressurised fluid towards a discharge chamber in case of an overpressure in the brake booster.

19. The device as claimed claim 18, wherein the disconnecting valve is connected to the chambers of the master cylinders and is arranged to transmit to the braking systems of the vehicle a control pressure that is the pressure depending on the actuating force applied to the piston of the cylinder or of the cylinders.

20. The device as claimed in claim 18, wherein the seats for the balancing valves are formed parallel to longitudinal axes of the master cylinders and in said body.

21. The device as claimed in claim 18, wherein the seats for the disconnecting valve are formed transversally to said longitudinal axes and in said body.

22. The device as claimed in claim 18, wherein each balancing valve includes a shutter slidable in a chamber communicating with a discharge chamber arranged to prevent oil possibly accumulated from remaining in a blind space in the chamber.

23. The device as claimed in claim 18, wherein the chambers of the master cylinders are further connected to a seat for a trailer brake valve, the chambers being arranged to transmit the fluid under pressure to said trailer brake valve and from said trailer brake valve to the outlet from the device connectable to a braking system of a trailer and in that the seat for the trailer brake valve and passages for transmitting the pressure to said trailer braking valve are also formed in the body.

24. The device as claimed in claim 18, wherein the disconnecting valve has a shutter that is biased to a closed position only by the pressure existing in the chamber of one of the master cylinders, without use of biasing mechanical members.

* * * * *